United States Patent [19]

Dümmen

[11] Patent Number: 5,426,890

[45] Date of Patent: Jun. 27, 1995

[54] CULTURE TRAY FOR GROWING YOUNG PLANTS

[76] Inventor: Günter Dümmen, Dammweg 20, D-47495 Rheinberg, Germany

[21] Appl. No.: 287,353

[22] Filed: Aug. 8, 1994

[30] Foreign Application Priority Data

Dec. 11, 1993 [DE] Germany .................. 9319024 U

[51] Int. Cl.[6] ........................................ A01G 9/02
[52] U.S. Cl. ............................... 47/87; 211/194; 206/507
[58] Field of Search .............. 206/507, 505; 211/194, 211/188; 47/87

[56] References Cited

U.S. PATENT DOCUMENTS

| | | | | |
|---|---|---|---|---|
| 3,883,037 | 5/1975 | Seiller | ........................ | 206/507 |
| 3,997,057 | 12/1976 | Craig | ........................ | 206/507 |
| 4,101,049 | 7/1978 | Wallace | ........................ | 206/507 |

FOREIGN PATENT DOCUMENTS

| | | | |
|---|---|---|---|
| 254434 | 1/1988 | European Pat. Off. | ............ 47/87 |
| 7406925 | 5/1974 | Netherlands | ............ 47/87 |
| 1384981 | 2/1975 | United Kingdom | ............ 47/87 |
| 2241222 | 8/1991 | United Kingdom | ............ 206/507 |

Primary Examiner—Henry E. Raduazo
Attorney, Agent, or Firm—Watson, Cole, Grindle & Watson

[57] ABSTRACT

A stackable culture tray for growing young plants includes pots which are moulded in parallel rows to a cover plate so as to be oriented downwardly relative to the cover plate, the bottoms of the pots including holes, the cover plate including a circumferential edge extending downwardly. A first row of pots has, instead of the two outermost pots, two supports and the last row has, instead of the two pots located second from the end, two supports which are hollow and open at the bottom and are oriented upwardly. Each of the two pots in the first row located second from the end includes a supporting ring at its bottom and each of the two outermost pots in the last row includes a supporting ring at its bottom. The upper end of each support has a centering shoulder.

6 Claims, 4 Drawing Sheets

CULTURE TRAY FOR GROWING YOUNG PLANTS

BACKGROUND AND SUMMARY OF THE INVENTION

The invention relates to a culture tray for growing young plants and having pots which are moulded to a cover plate of the culture tray in parallel rows and oriented downwardly with respect to the cover plate, the pots having holes at their bottoms, and the cover plate having a circumferential edge pointing downwardly.

A conventional culture tray of this kind includes pot-like depressions or pots in parallel rows, the depressions or pots being open at their top and having at their bottom an opening of smaller diameter. The small opening in the bottom enables the compressed root balls together with the young plant therein to be pushed from the bottom out of the pot-like depression and to let excess water drain. This culture tray is rectangular in shape and has a circumferential edge.

The invention has as its object providing a culture tray which when empty can be stacked one on another without any vertical spacing, and when containing young plants can be stacked with vertical spacing for transport and shipment, enabling the construction of stable stacks of great heights.

This object is achieved according to the invention in that the culture tray has a first row which, instead of the two outermost pots, has two supports, and wherein the last row has, instead of the two pots located second from the end, two supports which are hollow and open at the bottom and are oriented upwardly. Each one of the two pots in the first row located second from the end includes a supporting ring at its bottom, each of the two outermost pots in the last row includes a supporting ring at its bottom. The upper end of each support has a centering shoulder.

In this manner a culture tray for growing young plants is obtained that totally solves the aforementioned problem. In addition, the individual culture trays are stable and the stacks formed with these culture trays are also very stable, and in particular can be stacked with vertical spacing or stacked without any vertical spacing.

In another embodiment of the invention the supports exhibit in their walls facing inwardly of the culture tray one opening each. This enables the culture tray to be grasped in the openings by grippers of a conveyor, lifted, moved and set down again.

Expediently, the support rings can include lateral recesses at the bottom of the two outermost pots and the two second outermost pots. Thus, it is ensured that excess water can drain from these pots through the lateral recesses when these pots stand upright in a stack of culture plates on the opposite supports of the culture plate located below.

Moreover, it is recommended that the pots be connected with stabilizing webs below the cover plate.

In addition, one part of the stabilizing webs can be extended toward the bottom by an identical amount in a specific pattern.

Furthermore, the circumferential edge can exhibit a bottom notch at each of the four sides of the culture tray. Thus, it is possible to grasp the culture tray with grippers of a conveyor, lift, move and set it down again.

The invention will be explained in detail in the following with reference to the embodiment shown in the drawings.

DETAILED DESCRIPTION OF THE PREFERRED EMBODIMENT

Figure 1:
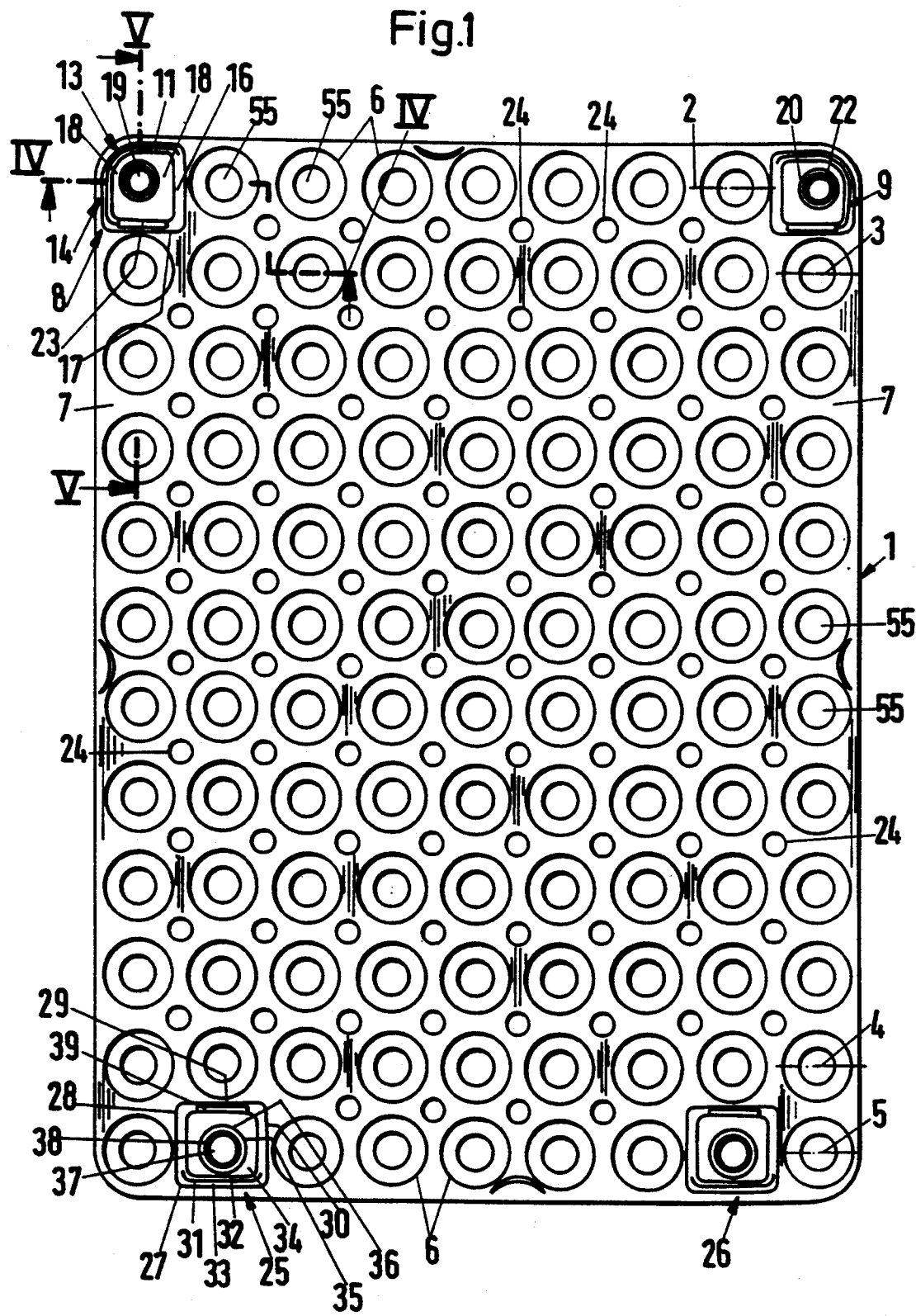
FIG. 1 is a top view of a culture tray according to the invention.

The culture tray 1 shown in the drawings serves to grow young plants. The culture tray is designed as a rectangle and has twelve parallel rows 2, 3, 4, 5 of nine pots 6, which are moulded to the cover plate 7 of the culture tray 1 and are shaped out toward the bottom opposite the cover plate.

The first row 2 has, instead of the two outermost pots, two supports 8, 9, whose bottom end 10 is designed to be open and hollow. The support 8 is attached to the culture tray 1 on a level with the cover plate 7 and designed conically at the top, forming a bottom step 11 and an upper step 12. Between the bottom step 11 and the upper step 12 an offset 15 is provided at the two walls 13, 14 of the support 8 facing outwardly. The two walls 16, 17 facing inwardly of the culture tray 1 are flat.

The upper end 18 of the support 8 has a centering shoulder 19, which comprises a cylindrical bottom centering member 20 and a cylindrical upper centering member 21, between which an offset 22 is provided. The wall 17 of the support 8 that borders the wall 16 has an opening 23.

The support 9, arranged opposite the support 8 in the first row 2, is designed similarly to support 8. Seven pots 6 are provided between both supports 8 and 9 of the first row 2. The other rows contain, with the exception of the last row 5, nine pots 6. Openings 24 are provided between the pots 6 in the cover plate 7.

Supports 25, 26 are provided between one outer and five inner pots in the last row 5. The support 25 has an outer wall 27 and three inner walls 28, 29, 30 and is attached to the culture tray on a level with the cover plate 7 of the culture tray 1. The outer wall 27 has a bottom region 31 and an upper region 32, between which a step 33 is provided. The upper end 34 of the support 25 has a centering shoulder 35, which comprises a bottom cylindrical member 36 and an upper cylindrical member 37, between which an offset 38 is provided.

The inwardly-oriented walls 28, 29, 30 are also designed to be flat. An opening 39 is provided in the wall 29. The support 26 located on the opposite side in the bottommost row 5 is designed similarly to the support 25.

Figure 2:
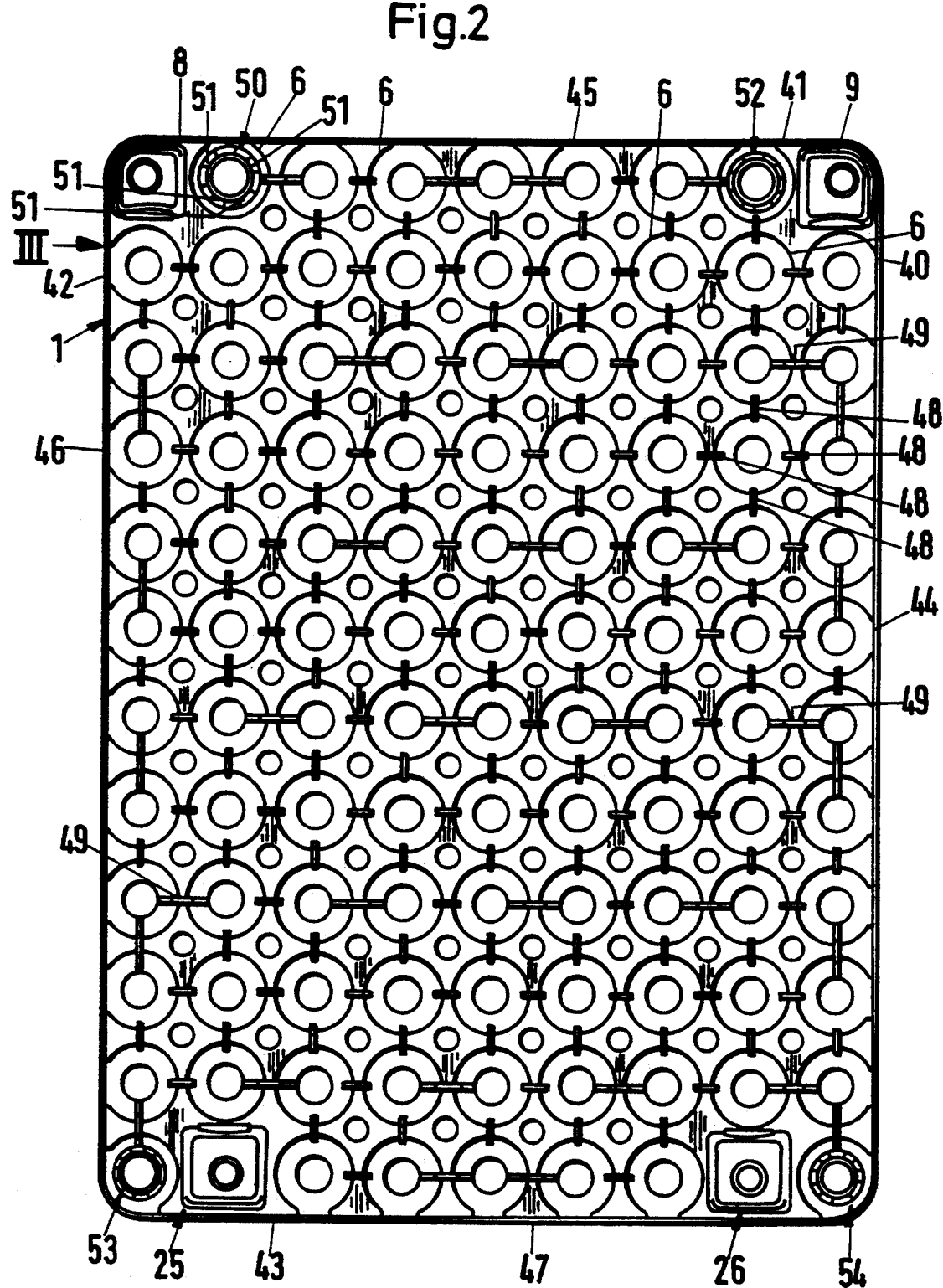
FIG. 2 is a bottom view of the culture tray of FIG. 1.
Figure 3:
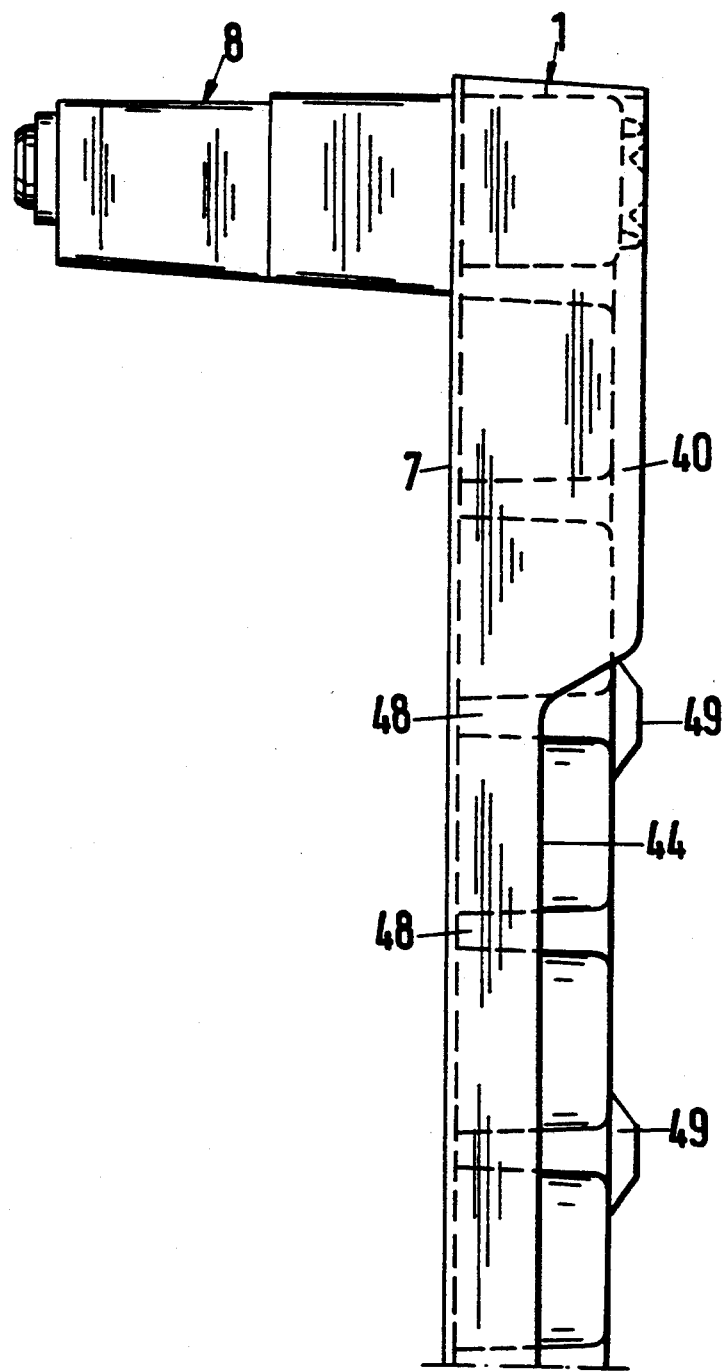
FIG. 3 is a side view of FIG. 1.

As shown in particular in FIG. 2, the culture plate has a circumferential edge 40, 41, 42, 43, in which recesses 44, 45, 46, 47 are provided. Each pot 6 is connected to the neighboring pots byway of stabilizing webs 48. A number of stabilizing webs 48 are distributed in a specific pattern over the bottom side of the culture tray 1 and provided with downwardly oriented extensions 49, with which the culture tray 1 stands rigidly and stably on a foundation.

The bottom of the pot adjacent to the support 8 has a cylindrical support ring 50, which includes several perforations 51 distributed over its circumference to drain excess water.

Figure 4:
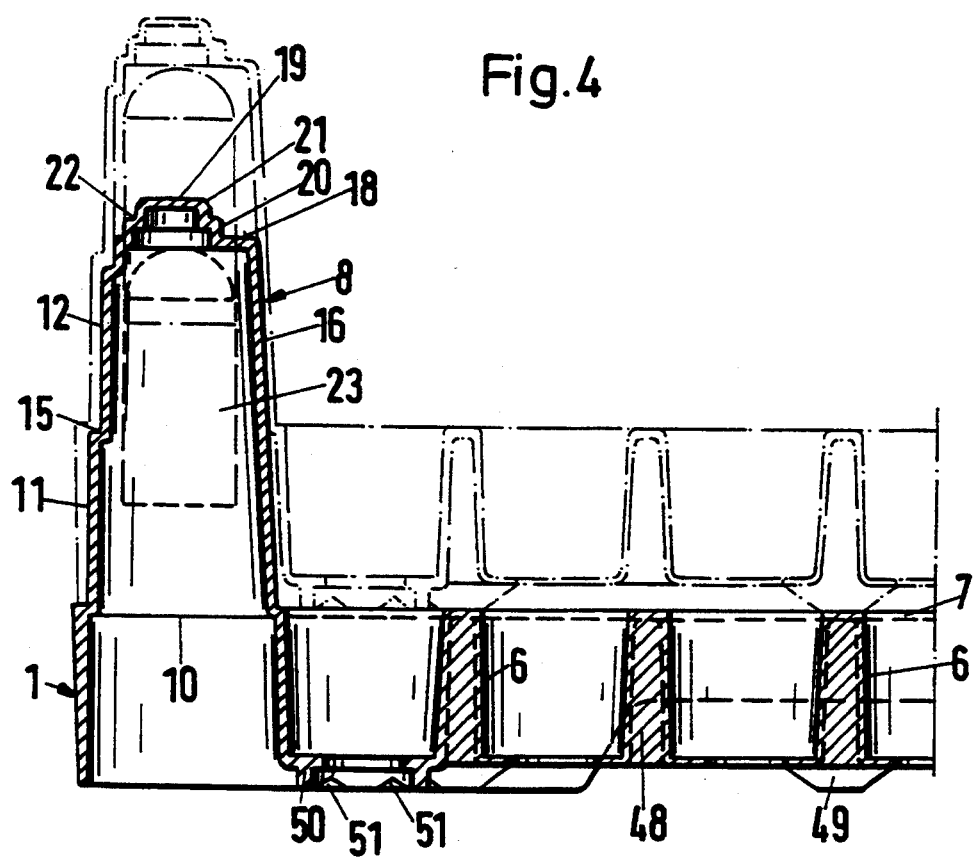
FIG. 4 is a sectional view along the line IV—IV of FIG. 1 through two culture trays, which are stacked without any space therebetween.

FIG. 4 depicts a state in which two culture trays are stacked without spacing. In so doing, the upper culture tray is put on the bottom culture tray in such a manner that the supports 8, 9, 25, 26 reach over the suitable supports of the bottom culture tray. The upper culture tray rests snugly on the bottom culture tray so that such a stack of a plurality of culture trays assumes vertically a minimum of space and exhibits high stability, so that there is no danger that a very high stack will fall over.

Figure 5:
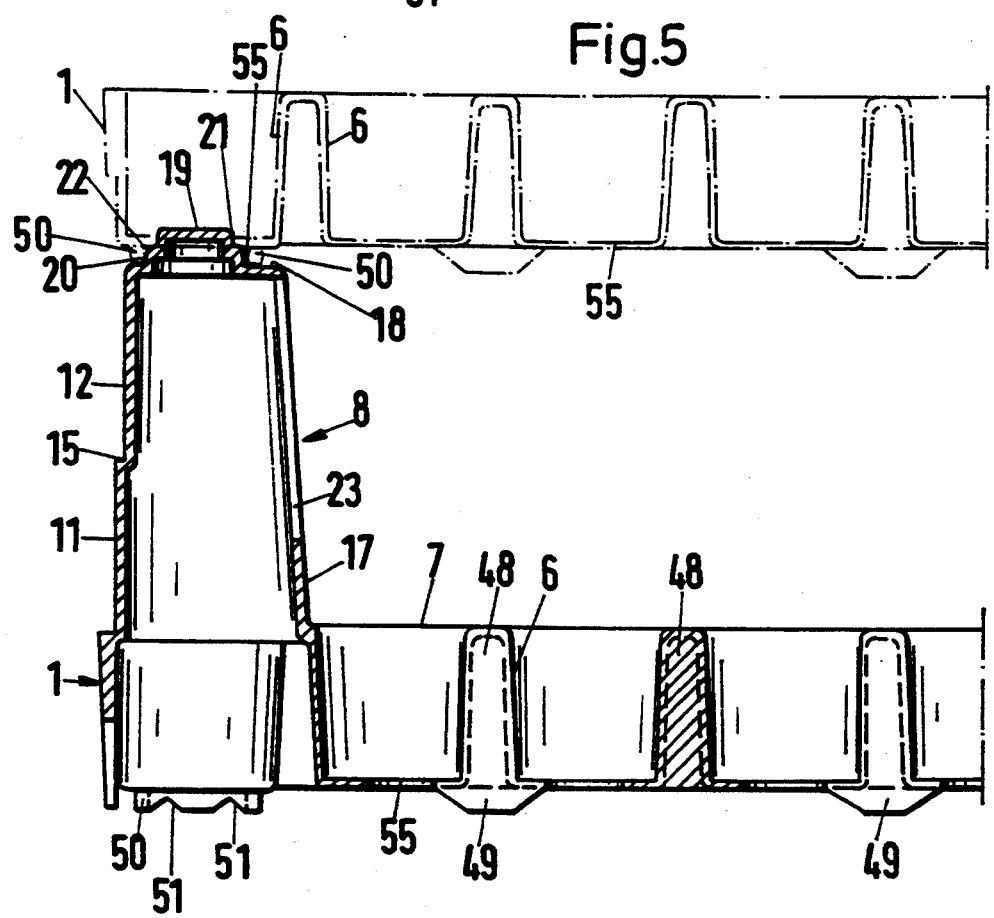
FIG. 5 is a sectional view along the line V—V of FIG. 1 through two stacked culture trays having space therebetween.

In FIG. 5 the upper culture tray has been turned 180° relative to the bottom culture tray, so that the upper culture tray stands upright with the support rings 50, 52, 53, 54 on the supports 8, 9, 25, 26 of the bottom culture tray. As such, the two culture trays have a vertical distance of twice the height of one culture tray. Even in this stacked state of several culture trays the stack is rigid and stable so that there is no danger of a very tall stack falling over.

The openings 23, 39 in the supports 8, 9, 25, 26 are provided for grippers of a device (not illustrated in the drawing) with which the culture trays are lifted, moved and set down again. The recesses 44, 45, 46, 47 provided in the edge 40, 41, 42, 43 of the culture tray 1 are also provided so that the culture tray can be grasped by grippers of this device, with which the culture tray is lifted, moved and set down again.

In the stack of several culture trays (shown in FIG. 5) that are spaced apart, the upper culture tray stands with the support ring 50 on the bottom 18 of the support 8 and is centered by means of the bottom region 20 of the centering shoulder 19. In addition, the upper member 21 of the centering shoulder 19 grasps through the bottom opening 55 of the pot 6. In this manner a reliable contact and centering of the upper culture tray on the bottom culture tray is guaranteed.

To put plants into the culture tray, the pots 6 are filled, first of all, with a compressed ball of flower soil. Then, slips are planted into the compressed balls. Thereafter, the culture trays are cultivated, i.e., rooted, for about three weeks, depending on the type of plant, in a greenhouse. Following completed cultivation, the culture trays are removed from the greenhouse and stacked, as shown in FIG. 5, and shipped in this state.

I claim:

1. A stackable culture tray for growing young plants which includes a cover plate, pots which are moulded in parallel rows to the cover plate and oriented downwardly relative to the cover plate, said pots including holes in their bottoms, said cover plate including a circumferential edge extending downwardly, wherein in a first row of pots two supports are connected to the cover plate instead of the two outermost pots; wherein in a last row of pots two supports are connected to the cover plate instead of the two pots located second from the end, said supports being hollow and open at their bottom and upwardly oriented; wherein each of the two pots in the first row located second from the end includes a supporting ring at its bottom; wherein each of the outermost pots in the last row includes a supporting ring at its bottom; and wherein an upper end of each support has a centering shoulder.

2. A stackable culture tray as claimed in claim 1, wherein the supports include an opening in a wall thereof facing inwardly of the culture tray.

3. A stackable culture tray as claimed in claim 1, wherein the support rings include lateral recesses.

4. A stackable culture tray as claimed in claim 1, including stabilizing webs connecting the pots below the cover plate.

5. A stackable culture tray as claimed in claim 4, wherein one part of the stabilizing webs is extended toward the bottom by an identical amount in a specific pattern.

6. A stackable culture tray as claimed in claim 1, wherein the culture tray defines four sides and wherein the circumferential edge includes a bottom notch at each of the four sides of the culture tray.

* * * * *